*United States Patent* [19]

Ikeda et al.

[11] 4,071,667

[45] Jan. 31, 1978

[54] PROCESS OF PREPARING POLYESTERS HAVING CARBONYL GROUP AND ETHER LINKAGE IN THE PRINCIPAL CHAIN THEREOF

[75] Inventors: Sakuji Ikeda, Tokyo; Kazuo Soga, Yokohama, both of Japan

[73] Assignee: Tokyo Institute of Technology, Tokyo, Japan

[21] Appl. No.: 646,013

[22] Filed: Jan. 2, 1976

[51] Int. Cl.² ............................................. C08G 67/00
[52] U.S. Cl. ................................................. 526/11.1
[58] Field of Search ..................... 526/11.1; 260/75 R

[56] References Cited

U.S. PATENT DOCUMENTS

| | | | |
|---|---|---|---|
| 2,462,680 | 2/1949 | Sargent | 526/11.1 |
| 2,495,286 | 1/1950 | Brubaker | 526/11.1 X |
| 3,083,184 | 3/1963 | Loeb | 526/11.1 X |

*Primary Examiner*—Lucille M. Phynes
*Attorney, Agent, or Firm*—Burgess, Ryan and Wayne

[57] ABSTRACT

There is provided a process of preparing polyesters having carbonyl group and ether linkage in the principal chain thereof by the reaction of carbon dioxide with vinyl compounds or diene compounds (diolefins) having Alfrey-Price's value of less than −0.9. Said reaction may be carried out in the presence of catalysts as shown below: alkoxides, acetylacetone complexes and alkyl compounds of titanium, magnesium, cobalt, manganese, zinc, aluminium, tin and mercury.

8 Claims, No Drawings

PROCESS OF PREPARING POLYESTERS HAVING CARBONYL GROUP AND ETHER LINKAGE IN THE PRINCIPAL CHAIN THEREOF

BACKGROUND OF THE INVENTION

Polyesters are prepared by the polycondensation of polybasic acids and polyhydric alcohols. Many kinds of polyesters can be obtained by different combinations of acids and alcohols. There are many processes for preparing polyesters. However, there has not yet been proposed a process for preparing polyesters involving the reaction of carbon dioxide with vinyl compounds or diene compounds. According to the present invention, new processes for preparing polyesters is provided.

SUMMARY OF THE INVENTION

The present invention relates to a process of preparing polyesters having carbonyl group and ether linkage in the principal chain thereof by the reaction of carbon dioxide with vinyl compounds or diene compounds (diolefins).

Typical vinyl compounds include methyl vinyl ether, ethyl vinyl ether, isobutyl vinyl ether and vinyltoluene, and typical diene compounds include butadiene and isoprene. These vinyl and diene compounds have Alfrey-Price's value of less than $-0.9$, and cationic polymerization can be effected in these compounds.

Said reaction of carbon dioxide with vinyl- or diene compounds may be carried out in solvents, for example, saturated aliphatic hydrocarbons such as n-heptane, aromatic hydrocarbons such as benzene, saturated cyclic compounds such as cyclohexane, alcohols such as methanol, ethers such as diethylether, ketones such as acetone and halogenated hydrocarbons such as chloroform.

Said reaction may be carried out in the presence of catalysts as shown below: alkoxides, acetylacetone complexes and alkyl compounds of titanium, magnesium, cobalt, manganese, zinc, aluminium, tin and mercury.

Said reaction may be carried out at a temperature of 20° to 150° C, preferably 60° to 120° C, in a molar ratio of 0.01 to 1,000, preferably 0.1 to 100, of carbon dioxide to vinyl- or diene compounds.

The polymer prepared by the process stated above has carbon dioxide at most in an amount of 50 mol% in the molecule, and carbon dioxide is in the form of ester linkage and ketone- or ether linkage in the polymer chain. As the content of carbon dioxide increases, the fraction of the ester linkage increases. When the content of carbon dioxide is near to 50 mol%, the fraction of the ester linkage becomes to about 100%.

DESCRIPTION OF THE PREFERRED EMBODIMENTS

The following examples are shown by way of illustration of the present invention only and are not intended as limitation of this invention.

EXAMPLE 1

4g of carbon dioxide and 1g of ethyl vinyl ether were placed in a stainless steel high-pressure tube, and the high-pressure tube was cooled to a temperature of liquid nitrogen and evacuated. After said mixture was allowed to react at a temperature of 100° C for 48 hours, reaction product was taken out of the high-pressure tube and purified by washing with a dilute methanol solution of hydrochloric acid and then methanol, and methanol was evaporated. In this way, 0.07g of colorless, transparent and sticky product was obtained. Said product was a polymer having $\eta/C$ of 0.03. Said $\eta/C$ was measured at 25° C by Ubbelohde's viscometer, using a solution of 0.1g of the polymer in 10 ml of methanol. Nuclear magnetic resonance (NMR) analysis showed that said polymer has the following formula:

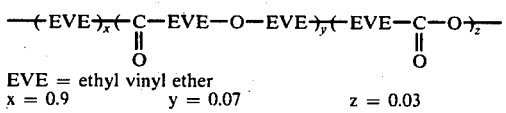

EVE = ethyl vinyl ether
x = 0.9    y = 0.07    z = 0.03

EXAMPLE 2

5g of carbon dioxide, 1g of ethyl vinyl ether, 10mg of aluminium isoproxide and 2g of dichloromethane were placed in a stainless steel high-pressure tube. 0.105g of colorless, transparent and sticky product was obtained by repeating the same procedure as that of Example 1 except that the mixture was allowed to react at a temperature of 80° C for 48 hours. Said product was a polymer having $\eta/C$ of 0.15. NMR analysis showed that said polymer has the following formula:

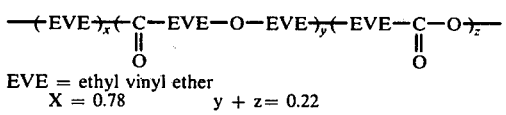

EVE = ethyl vinyl ether
X = 0.78    y + z = 0.22

EXAMPLE 3

5g of carbon dioxide, 1.5g of ethyl vinyl ether, 10mg of zinc acetylacetonate and 5g of dichloromethane were placed in a stainless steel high-pressure tube. 0.12g of colorless, transparent and sticky product was obtained by repeating the same procedure as that of Example 1 except that the mixture was allowed to react at a temperature of 80° C for 50 hours. Said product was a polymer having $\eta/C$ of 0.2. NMR analysis showed that said polymer has the following formula:

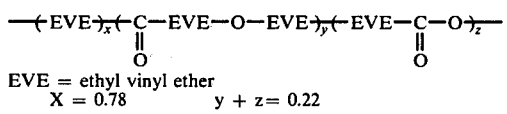

EVE = ethyl vinyl ether
X = 0.78    y + z = 0.22

EXAMPLE 4

5g of carbon dioxide and 0.65g of 1,3-butadiene were placed in a stainless steel high-pressure tube. 0.1g of colorless, and sticky product was obtained by repeating the same procedure as that of Example 1 except that the mixture was allowed to react at a temperature of 115° C for 95 hours. MNR analysis showed that said product is a polymer having the following formula:

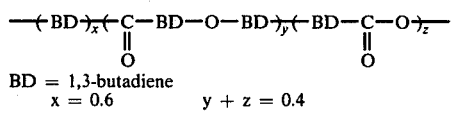

BD = 1,3-butadiene
x = 0.6    y + z = 0.4

In Examples 2 and 3, among the catalysts as shown below, aluminium isopropoxide and zinc acetylacetonate were used:

alkoxides, acetylacetone complexes and alkyl compounds of titanium, magnesium, cobalt, manganese, zinc, aluminium, tin and mercury.

However, the other catalysts also can give results similar to those as described in Examples 2 and 3.

We claim:

1. A process of preparing poylesters having carbonyl groups and ether likages in the principal chain thereof which consists essentially of reacting carbon dioxide with vinyl compounds or diene compounds having Alfrey-Prices values of less than −0.9.

2. A process for preparing polyesters having carbonyl groups and ether linkages in the principal chain thereof which comprises reacting carbon dioxide with vinyl compounds or diene compounds having Alfrey-Price values of less than −0.9 in the presence of a catalyst selected from the group consisting of alkoxides, acetylacetone complexes and alkyl compounds of titanium, magnesium, cobalt, manganese, zinc, aluminium, tin and mercury.

3. A process according to claim 1 wherein said reaction is carried out at a temperature range of 20°–150° C.

4. A process according to claim 3 in which said temperature is between 60°–120° C.

5. A process according to claim 1 in which the molar ratio of said carbon dioxide to said vinyl or said diene compound is 0.01 to 1000.

6. A process according to claim 2 wherein said reaction is carried out at a temperature range of 20°–150° C.

7. A process according to claim 2 in which said temperature is between 60°–120° C.

8. A process according to claim 2 in which the molar ratio of said carbon dioxide to said vinyl or said diene compound is 0.01 to 1000.

* * * * *

UNITED STATES PATENT OFFICE
CERTIFICATE OF CORRECTION

Patent No. 4,071,667   Dated January 31, 1978

Inventor(s) Sakuji Ikeda, et al

It is certified that error appears in the above-identified patent and that said Letters Patent are hereby corrected as shown below:

Column 2, lines 4, 25 & 42:  "$\eta/C$" should be -- $\eta_{sp}/C$ --.

Column 3, line 8: "likages" should be --linkages--.

Signed and Sealed this

Twenty-seventh Day of June 1978

[SEAL]

Attest:

RUTH C. MASON
*Attesting Officer*

DONALD W. BANNER
*Commissioner of Patents and Trademarks*